Patented July 29, 1941

2,250,457

UNITED STATES PATENT OFFICE 2,250,457

PORCELAIN ENAMEL

Monroe J. Bahnsen, Lakewood, and Eugene E. Bryant, Bedford, Ohio, assignors to Ferro Enamel Corporation, Cleveland, Ohio, a corporation of Ohio No Drawing. Application October 16, 1940, Serial No. 361,448

15 Claims. (Cl. 106—48)

The present invention relates as indicated to porcelain enamels and particularly enamels having high covering power and characterized further in that they contain appreciable amounts of zirconium oxide and that they are free or substantially free of antimony.

Opaque enamels, i. e., those which have satisfactory covering power and give high reflectance, as measured by present-day commercial standards, generally contain substantial amounts of antimony. Antimony-bearing compounds and antimony complexes are generally relied upon to impart opacity to enamels for the reason that these substances are white and of a different refractive index than the glass in which they are uniformly distributed. To obtain a high degree of opacity in antimony-bearing enamels, it is necessary to smelt the raw batch at as low a temperature as possible and still melt the glass to a viscous liquid condition. These enamels thus made under such conditions must be very carefully smelted in order to insure uniform distribution of the antimony-bearing materials throughout the glass body.

The low smelting temperatures used on antimony-bearing glasses are necessary because at higher temperatures there is a tendency for some of the antimony-bearing material to be volatilized and thereby lost and also the remaining antimony-bearing materials dissolved to some extent in the glass matrix and thus lose their opacifying effect.

As the amount of antimony added in the raw batch is increased, in order to increase opacity, the amount of glass-forming materials or fluxes is, of course, proportionately decreased. This also tends to increase the viscosity of the antimony-bearing glasses during smelting.

Commercial practice today utilizes about the maximum possible amount of antimony-bearing materials in the smelter, the upper limit, as indicated, being determined by the difficulties encountered in smelting.

Accordingly, antimony compounds have been added to the frit as mill additions. The antimony-bearing glasses have also been employed in conjunction with well-known mill additions such as tin oxide, zirconium and titanium compounds, as well as various so-called "gas or bubble" opacifiers. There is, however, also an upper practical limit to the concentrations in which these various mill additions may be employed.

As indicated, when the opacity of enamel is increased in accordance with conventional methods in use today, the viscosity of the enamel is increased at the same time. Commercially available, high opacity enamels in use today are, therefore, much more viscous than the enamels of the past, and can be used today only by very careful control in their manufacture and use.

A further difficulty with low firing, high viscosity enamels is their tendency to blister during firing. It has been quite definitely shown that high viscosity and under-smelting are primary causes of blistering.

It is a principle of this invention, therefore, to provide an enamel characterized by high opacity. Due to the omission of antimony from enamels comprising this invention, they are characterized by high fluidity and are, therefore, more like the clear glasses originally employed as enamels with, however, the added property of high opacity.

The omission of antimony from the enamel also very substantially reduces its cost.

Other objects of this invention will appear as the description proceeds.

To the accomplishment of the foregoing and related ends, said invention, then, consists of the steps hereinafter fully described and particularly pointed out in the claims.

The following description sets forth in detail one approved method of carrying out the invention, such disclosed method, however, constituting but one of various ways in which the principle of the invention may be used.

Broadly stated, this invention comprises the discovery that by the use of substantial amounts of phosphorous-containing compounds in zirconium-bearing antimony-free frits and particularly in frits of a relatively narrow range of composition, the frit which, as normally smelted, is a substantially clear glaze, but upon firing on the ware, has a very substantial degree of opacity. These improved frits, when combined with various mill additions, are capable of producing extremely high opacity heretofore not possible excepting with difficulty and much more expensive materials.

Heretofore, there has been a marked color difference between these zircon enamels and the antimony enamels in use at the present time. This color difference is objectionable when it is desired to maintain a color match with previous work which has been run in antimony bearing enamels.

It has been discovered that additions of small amounts of titanium dioxide or manganese dioxide or mixtures of these two when smelted with the raw batch will greatly improve the color so that the resulting glass will have essentially the same color as the present antimony bearing enamels. Boric acid may be used up to the percentages indicated below to desirably lower the fusion temperature without increasing the alkali content of the composition.

A frit made in accordance with the present invention may be produced from a raw batch mixture having the following range of compositions:

Table A

| | Per cent |
|---|---|
| Silica sand | 0– 3 |
| Dehydrated borax | 15–19 |
| Feldspar | 22–33 |
| Zircon sand | 17–21 |
| Sodium nitrate | 1– 2 |
| Fluorspar | 4– 8 |
| Sodium fluo silicate | 11–17 |
| Bone ash | 4– 6 |
| Aluminum hydrate | 3– 5 |
| Zinc oxide | 2– 3 |
| Titanium dioxide | 0– 1 |
| Manganese dioxide | 0– 1 |
| Boric acid | 0– 8 |
| Calcium carbonate | 0– 5 |

The calculated oxide compositions of the resultant frit produced from raw batch compositions within the above range is as follows:

Table B

| | Per cent |
|---|---|
| $SiO_2$ | 29–35 |
| $ZrO_2$ | 11–14 |
| $B_2O_3$ | 10–16 |
| $Na_2O$ | 9–13 |
| $K_2O$ | 2– 4 |
| $CaO$ | 5– 9 |
| $Al_2O_3$ | 7– 8 |
| $ZnO$ | 2– 3 |
| $F_2$ | 9–13 |
| $P_2O_5$ | 2– 3 |
| $TiO_2$ | 0– 1 |
| $MnO_2$ | 0– 1 |

The following table gives eight specific examples of raw batch mixes coming within the range of Table A above:

Table C

| | Ex. 1 | Ex. 2 | Ex. 3 | Ex. 4 | Ex. 5 | Ex. 6 | Ex. 7 | Ex. 8 |
|---|---|---|---|---|---|---|---|---|
| Silica sand | 2.85 | None | None | None | None | 2.82 | 2.84 | 2.57 |
| Dehydrated borax | 18.15 | 17.46 | 16.00 | 15.4 | 15.6 | 17.96 | 18.08 | 16.37 |
| Feldspar | 24.90 | 32.50 | 32.00 | 32.4 | 32.8 | 24.75 | 24.91 | 22.55 |
| Zircon sand | 19.30 | 20.70 | 20.4 | 20.6 | 20.9 | 19.14 | 19.27 | 17.44 |
| Sodium nitrate | 1.15 | 1.22 | 1.2 | 1.2 | 1.25 | 1.11 | 1.12 | 1.01 |
| Fluorspar | 4.55 | 4.88 | 4.8 | 7.3 | 5.00 | 4.49 | 4.52 | 4.09 |
| Sodium fluo silicate | 16.25 | 11.38 | 13.7 | 11.5 | 13.10 | 16.15 | 16.26 | 14.72 |
| Bone ash | 5.30 | 5.69 | 5.6 | 5.7 | 5.00 | 5.26 | 5.29 | 4.79 |
| Aluminum hydrate | 4.90 | 3.25 | 3.2 | 3.2 | 3.25 | 4.87 | 4.91 | 4.44 |
| Zinc oxide | 2.65 | 2.84 | 2.8 | 2.8 | 2.90 | 2.65 | 2.66 | 2.41 |
| Titanium dioxide | | | | | | 0.80 | | |
| Manganese dioxide | | | | | | | 0.14 | 0.09 |
| Boric acid | | | | | | | | 6.34 |
| Calcium carbonate | | | | | | | | 3.17 |

The calculated oxide content of the frit smelted from the raw batch mixtures given in Table C above is approximately as follows:

Table D

| | Ex. 1 | Ex. 2 | Ex. 3 | Ex. 4 | Ex. 5 | Ex. 6 | Ex. 7 | Ex. 8 |
|---|---|---|---|---|---|---|---|---|
| $SiO_2$ | 31.64 | 32.93 | 33.20 | 32.86 | 34.30 | 30.56 | 30.75 | 29.10 |
| $ZrO_2$ | 12.83 | 13.80 | 13.65 | 13.80 | 14.00 | 12.50 | 12.61 | 11.91 |
| $B_2O_3$ | 12.55 | 12.08 | 11.05 | 10.65 | 10.80 | 12.11 | 12.19 | 15.16 |
| $Na_2O$ | 12.18 | 10.58 | 10.87 | 9.94 | 10.56 | 11.71 | 11.78 | 11.15 |
| $K_2O$ | 2.50 | 3.25 | 3.20 | 3.24 | 3.28 | 2.41 | 2.43 | 2.30 |
| $CaO$ | 6.14 | 6.59 | 6.49 | 8.33 | 5.30 | 5.92 | 5.95 | 7.44 |
| $Al_2O_3$ | 7.67 | 7.96 | 7.85 | 7.81 | 8.00 | 7.41 | 7.46 | 7.05 |
| $ZnO$ | 2.65 | 2.84 | 2.80 | 2.80 | 2.90 | 2.58 | 2.59 | 2.45 |
| $F_2$ | 12.07 | 9.28 | 10.64 | 10.53 | 10.39 | 11.67 | 11.74 | 11.11 |
| $P_2O_5$ | 2.43 | 2.62 | 2.56 | 2.61 | 2.29 | 2.35 | 2.36 | 2.23 |
| $TiO_2$ | | | | | | 0.78 | | |
| $MnO_2$ | | | | | | | 0.14 | 0.10 |

The foregoing tables of compositions give specific examples which have been eminently successful commercially. It will be evident to those familiar with the art that certain changes may always be made in the proportionate amounts of the specific components above-mentioned, as, for example, the feldspar content may be increased, in which case, there would be corresponding reductions in the amount of silica and alkalis used and similarly, sodium fluo silicate may be varied with corresponding variations in the amount of borax used and also cryolite may be used in complete or partial substitution for the sodium fluo silicate. In the appended claims, therefore, where reference is had to specific compositions, it will be understood that alterations therein, such as the above specified, are to be included, since they do not materially affect the results achieved.

The raw mix constituents within the proportions given in the foregoing tables are smelted in a conventional manner, as for example, in a smelter of the type disclosed in U. S. Patent Nos. 2,097,378 and 2,097,379. These enamels are usually smelted at a temperature of approximately 2250° F. and the rate of cooling, after smelting, determines the character of the frit insofar as its opacity is concerned, although it does not materially affect the opacity of the enamel on the ultimate work-piece. For example, if the smelted frit is very rapidly cooled, as by discharge of a stream of the same into the water bath, a substantially clear frit is produced. If, however, the enamel is permitted to cool rather slowly after smelting, and permitted to "anneal" at a temperature on the order of about 1400° F. to 1800° F., the resultant frit will be quite white, indicating the nature of the action which takes place when the frit, without the addition of any opacifier, is fired onto a metallic article. It is believed that the slow cooling develops a crystalline structure highly refractive in its nature, thus accounting for the opacity developed by slow cooling. While we do not wish to be limited to any particular theory on which the results of the present invention are achieved, nevertheless, the action of the glass in the smelter during the "annealing" stage, above referred to, seems to confirm this conclusion.

As indicated, a frit produced in accordance with this invention which, if quickly cooled from a high temperature, is a clear frit or alternatively, if fritted from an annealing temperature is a white frit, will, when deposited in a conventional manner and fired on the metallic article, produce a white enamel of unexpected covering power. Thus, for example, when fired on a sheet metal article at a temperature of 1500° F. to 1520° F., 64 grams per square foot will have a total reflectance of 79%. These results are based on two coats of application over conventional blue ground coat. The above figures give an indication of the remarkable covering power of this enamel, even without the use of any of the many available mill addition opacifiers with which this enamel may be employed. Since the employment of a small amount of opacifier as a mill addition is desirable from an economic standpoint, it is within the contemplation of our invention to use the enamel of the present invention in conjunction with mill additions of various types.

The mill additions used will include the usual electrolytes or setting-up salts, such as magnesium carbonate, potassium carbonate, sodium nitrite and sodium aluminate usually employed in amounts up to ½ lb. per 100 lbs. of frit.

Clay is used as a mill addition for the purposes for which the clay is used as a mill addition with enamels generally. A small amount of bentonite in addition or in partial substitution of the clay will be found helpful in improving the setting-up properties of the enamel and increasing the strength of the dry bisque.

As above indicated, opacifiers are advantageously used as mill additions in conjunction with this improved enamel and it will be found that best results are secured by the use of the zirconium type opacifier of which there are several at present commercially available.

The compositions of various zirconium opacifiers will be found in the following U. S. patents: 1,562,890, 1,789,311, 2,083,024, 2,100,337, 2,102,627. Opacifiers of this character, i. e., zirconium-bearing opacifiers, will generally be found most useful in amounts up to about 5%, since concentrations higher than 5% are generally not as economical as the lower concentrations.

It has also been found advantageous to add one or two pounds of zinc oxide or calcined aluminum oxide to the mill for every hundred pounds of frit used. These materials are added in addition to the usual opacifiers. These additions are helpful in stabilizing maximum opacity and at the same time tend to produce a smoother coating.

A typical example of a mill addition is as follows:

| | Per 100 pounds of frit |
|---|---|
| Clay | pounds 7½ |
| Zirconium opacifier | do 3 |
| Zinc oxide or aluminum oxide | do 1 |
| Potassium carbonate | ounces 6 |
| Gum tragacanth | do ¼ |
| Water | pounds 38 |

As previously indicated, minor amounts of bentonite, on the order of 2 oz. per hundred pounds of frit may be advantageously employed on occasion. The frit and the mill additions are ground to a fineness such that there will be a 1-8 gram residue on a 200 mesh screen from a 50 cc. sample at a specific gravity of 1.82.

The gum tragacanth in the amounts specified above as a mill addition is useful for the purpose of giving film strength in the dry bisque.

By the foregoing specified examples of mill additions and particularly opacifiers which may be employed in conjunction with the enamel of our invention, we, of course, do not intend to be limited to the use of such specifically named materials, since our enamel can be advantageously employed in conjunction with other mill additions and particularly other opacifiers. Thus, for example, we have been able to secure very satisfactory results indeed, by the use of so-called "gas or bubble" opacifiers and very good results have been secured by the combined use of gas opacifiers and zirconium opacifiers. As specific examples of gas opacifiers which have been found useful, we may mention aluminum stearate, aluminum acetate and ethylene glycol. Aluminum stearate will generally be found to produce best results when employed in concentrations of about 2-3 oz. per 100 lbs. of frit; ethylene glycol in the same concentrations, and aluminum acetate 4-5 oz. per 100 lbs.

Other gas opacifiers which may be used to advantage are those given in U. S. Patent Nos. 1,948,461, 2,102,630, 2,103,228, 2,103,229, and 2,147,202.

Our improved enamel may be employed for application to either sheet metal or cast iron (either wet or dry process) either a grip coat or a conventional ground coat being usually employed for best results. The specific formulas given herein are primarily designed for use on sheet steel, since the compositions as given are inclined to be slightly too hard for use on cast iron. However, the composition may be readily modified to produce a softer firing enamel which may be more suitable for use on cast iron than those above given. As an indication of the very high degree of opacity obtainable by the use of our improved enamel, we might explain that single coat applications of 35-45 grams per square foot over a conventional sheet steel blue ground coat using approximately 3 lbs. per 100 lbs. of frit of zirconium opacifier as a mill addition and fired at 1500° F. to 1520° F. will produce reflectances on the order of about 68 to 75%. It will thus be seen that the present enamel is admirably suited for the production of commercial articles by one cover coat of application.

While it has been indicated above that there may be certain variations made in the composition of the raw mix from which our enamels are produced, it should, nevertheless, be pointed out that the zirconium and phosphorus content, as given in the several tables, has been found to be rather critical both as to the amounts employed and the proportional relationship therebetween.

This application is a continuation-in-part of our co-pending application Serial Number 311,362, filed December 28, 1939.

Other modes of applying the principle of our invention may be employed instead of the one explained, change being made as regards the method herein disclosed, provided the step or steps stated by any of the following claims or the equivalent of such stated step or steps be employed.

We therefore particularly point out and distinctly claim as our invention:

1. The method of making a porcelain enamel article having an opaque coating which comprises smelting an antimony-free raw batch mixture of fusible enamel ingredients to form a relatively fluid melt containing phosphorus in an amount equal to about 2% to 3% of $P_2O_5$, zirconium oxide in an amount equal to about 11% to 14%, milling a slip containing said frit, coating the ware with said slip and burning the same to form said opaque surface.

2. An antimony-free opaque vitreous enamel characterized by high fluidity and reflectance when cooled at a relatively slow rate, such characteristics being imparted thereto by the presence therein of phosphorus in an amount made available by the presence of on the order of about 2% to about 3% of $P_2O_5$ and zirconium oxide in an amount equal to about 11% to 14%.

3. A porcelain enamel frit of the character produced by smelting a raw batch mixture comprising about:

| | Per cent |
|---|---|
| Silica sand | 0 to 3 |
| Dehydrated borax | 15 to 19 |
| Feldspar | 22 to 33 |
| Zircon sand | 17 to 21 |
| Sodium nitrate | 1 to 2 |
| Fluorspar | 4 to 8 |
| Sodium fluo silicate | 11 to 17 |
| Bone ash | 4 to 6 |
| Aluminum hydrate | 3 to 5 |
| Zinc oxide | 2 to 3 | and at least one of the following within their respective ranges:

| | Per cent |
|---|---|
| Titanium dioxide | Up to 1 |
| Manganese dioxide | Up to 1 |
| Boric acid | Up to 8 |
| Calcium carbonate | Up to 5 |

4. A porcelain enamel frit of the character produced by smelting a raw batch mixture the calculated oxide content of which comprises about:

| | Per cent |
|---|---|
| $SiO_2$ | 29 to 35 |
| $ZrO_2$ | 11 to 14 |
| $B_2O_3$ | 10 to 16 |
| $Na_2O$ | 9 to 13 |
| $K_2O$ | 2 to 4 |
| CaO | 5 to 9 |
| $Al_2O_3$ | 7 to 8 |
| ZnO | 2 to 3 |
| $F_2$ | 9 to 13 |
| $P_2O_5$ | 2 to 3 | and at least one of the following within their respective ranges:

| | Per cent |
|---|---|
| $TiO_2$ | Up to 1 |
| $MnO_2$ | Up to 1 |

5. A porcelain enamel frit of the character produced by smelting a raw batch mixture of the following composition:

| | Per cent |
|---|---|
| Dehydrated borax | 17.46 |
| Feldspar | 32.50 |
| Zircon sand | 20.70 |
| Sodium nitrate | 1.22 |
| Fluorspar | 4.88 |
| Sodium fluo silicate | 11.38 |
| Bone ash | 5.69 |
| Aluminum hydrate | 3.25 |
| Zinc oxide | 2.84 |

6. A porcelain enamel frit having a calculated oxide content which is substantially as follows:

| | Per cent |
|---|---|
| $SiO_2$ | 30.56 |
| $ZrO_2$ | 12.50 |
| $B_2O_3$ | 12.11 |
| $Na_2O$ | 11.71 |
| $K_2O$ | 2.41 |
| CaO | 5.92 |
| $Al_2O_3$ | 7.41 |
| ZnO | 2.58 |
| $F_2$ | 11.67 |
| $P_2O_5$ | 2.35 |
| $TiO_2$ | 0.78 |

7. A porcelain enamel frit having a calculated oxide content which is substantially as follows:

| | Per cent |
|---|---|
| $SiO_2$ | 29.10 |
| $ZrO_2$ | 11.91 |
| $B_2O_3$ | 15.16 |
| $Na_2O$ | 11.15 |
| $K_2O$ | 2.30 |
| CaO | 7.44 |
| $Al_2O_3$ | 7.05 |
| ZnO | 2.45 |
| $F_2$ | 11.11 |
| $P_2O_5$ | 2.23 |
| $MnO_2$ | 0.10 |

8. A porcelain enamel frit of the character produced by smelting at 2250° a raw batch mixture of the following composition:

| | Per cent |
|---|---|
| Silica sand | 2.82 |
| Dehydrated borax | 17.96 |
| Feldspar | 24.75 |
| Zircon sand | 19.14 |
| Sodium nitrate | 1.11 |
| Fluorspar | 4.49 |
| Sodium fluo silicate | 16.15 |
| Bone ash | 5.26 |
| Aluminum hydrate | 4.87 |
| Zinc oxide | 2.65 |
| Titanium dioxide | 0.80 |

9. A porcelain enamel frit of the character produced by smelting at 2250° a raw batch of the mixture of the following composition:

| | Per cent |
|---|---|
| Silica sand | 2.57 |
| Dehydrated borax | 16.37 |
| Feldspar | 22.55 |
| Zircon sand | 17.44 |
| Sodium nitrate | 1.01 |
| Fluorspar | 4.09 |
| Sodium fluo silicate | 14.72 |
| Bone ash | 4.79 |
| Aluminum hydrate | 4.44 |
| Zinc oxide | 2.41 |
| Manganese dioxide | 0.09 |
| Boric acid | 6.34 |
| Calcium carbonate | 3.17 |

10. A porcelain enamel slip comprising the enamel of claim 2 and the following mill additions in the amounts specified per 100 pounds of frit:

| | | |
|---|---|---|
| Clay | pounds | 7½ |
| Zirconium opacifier | do | 3 |
| Zinc oxide | do | 1 |
| Potassium carbonate | ounces | 6 |
| Gum tragacanth | do | ¼ |
| Water | pounds | 38 |

11. A porcelain enamel slip comprising the enamel of claim 2 and the following mill additions in the amounts specified per 100 pounds of frit:

| | | |
|---|---|---|
| Clay | pounds | 7½ |
| Zirconium opacifier | do | 3 |
| Aluminum oxide | do | 1 |
| Potassium carbonate | ounces | 6 |
| Gum tragacanth | do | ¼ |
| Water | pounds | 38 |

12. A porcelain enamel frit of the character produced by smelting a raw batch mixture comprising about:

| | Per cent |
|---|---|
| Silica sand | 2.84 |
| Dehydrated borax | 18.08 |
| Feldspar | 24.91 |
| Zircon sand | 19.27 |
| Sodium nitrate | 1.12 |
| Fluorspar | 4.52 |
| Sodium fluo silicate | 16.26 |
| Bone ash | 5.29 |
| Aluminum hydrate | 4.91 |
| Zinc oxide | 2.66 |
| Manganese dioxide | 0.14 |

13. A porcelain enamel frit having a calculated oxide content comprising about:

| | Per cent |
|---|---|
| SiO₂ | 30.75 |
| ZrO₂ | 12.61 |
| B₂O₃ | 12.19 |
| Na₂O | 11.78 |
| K₂O | 2.43 |
| CaO | 5.95 |
| Al₂O₃ | 7.46 |
| ZnO | 2.59 |
| F₂ | 11.74 |
| P₂O₅ | 2.36 |
| MnO₂ | 0.14 |

14. A porcelain enamel frit of the character produced by smelting a raw batch mixture comprising about:

| | Per cent |
|---|---|
| Silica sand | 0 to 3 |
| Dehydrated borax | 15 to 19 |
| Feldspar | 22 to 33 |
| Zircon sand | 17 to 21 |
| Sodium nitrate | 1 to 2 |
| Fluorspar | 4 to 8 |
| Sodium fluo silicate | 11 to 17 |
| Bone ash | 4 to 6 |
| Aluminum hydrate | 3 to 5 |
| Zinc oxide | 2 to 3 |

15. A porcelain enamel frit of the character produced by smelting a raw batch mixture, the calculated oxide content of which comprises about:

| | Per cent |
|---|---|
| SiO₂ | 29 to 35 |
| ZrO₂ | 11 to 14 |
| B₂O₃ | 10 to 16 |
| Na₂O | 9 to 13 |
| K₂O | 2 to 4 |
| CaO | 5 to 9 |
| Al₂O₃ | 7 to 8 |
| ZnO | 2 to 3 |
| F₂ | 9 to 13 |
| P₂O₅ | 2 to 3 |

MONROE J. BAHNSEN.
EUGENE E. BRYANT.